United States Patent [19]

McMackin

[11] 4,325,021
[45] Apr. 13, 1982

[54] REGULATED SWITCHING APPARATUS

[75] Inventor: John B. McMackin, Essington, Pa.

[73] Assignee: RCA Corporation, New York, N.Y.

[21] Appl. No.: 190,987

[22] Filed: Sep. 26, 1980

[51] Int. Cl.³ .............................................. G05F 1/56
[52] U.S. Cl. ................................... 323/351; 323/288;
307/263
[58] Field of Search ................................ 323/280–282,
323/284, 288, 349, 351; 307/263; 363/19, 21

[56] References Cited

U.S. PATENT DOCUMENTS

| | | | |
|---|---|---|---|
| 3,524,124 | 8/1970 | Perkinson | 323/225 |
| 3,577,065 | 5/1971 | Putzrath et al. | 323/287 |
| 3,781,642 | 12/1973 | Dutton | 323/288 |
| 3,979,610 | 9/1976 | Gordon | 307/297 |
| 3,982,174 | 9/1976 | Maddox | 323/287 |
| 4,107,596 | 8/1978 | Weaver et al. | 323/288 |
| 4,195,335 | 3/1980 | Murakami et al. | 363/49 |

Primary Examiner—William M. Shoop
Assistant Examiner—Peter S. Wong
Attorney, Agent, or Firm—Samuel Cohen; Robert L. Troike; Christopher L. Maginniss

[57] ABSTRACT

An apparatus for switching DC power has linearly regulated turn-on and turn-off switching transitions. The apparatus includes a differential amplifier with negative feedback which drives the control input of a controllable pass element in response to a ramp signal applied to one input of the amplifier. Feedback from the output terminal of the pass element limits the slope of the signal at the amplifier output to provide substantially linear switching transitions.

3 Claims, 2 Drawing Figures

REGULATED SWITCHING APPARATUS

The Government has rights in this invention pursuant to Contract No. N62269-77-C-0413 awarded by the Department of the Navy.

The present invention relates to switching apparatus and, more particularly, to a circuit which provides regulated turn-on and turn-off switching transitions for a DC power control thereby reducing the electromagnetic interference (EMI) radiated during switching periods.

In a conventional DC power control employing a switching transistor as the pass element between an input voltage and load, a step voltage applied to the control input of the switching transistor causes the transistor to switch very rapidly between its cutoff and saturated states. As a result, EMI is radiated during switching periods and may cause disturbances in the load or other associated circuitry. These disturbances manifest themselves as baseband noise or as perturbations on control lines. Shielded cables have been utilized to contain EMI but shielding adds both cost and weight to the electronics and its cabling. Clearly it is more desirable to eliminate the source of the EMI than to attempt to protect other circuits from its effect.

One method commonly employed for eliminating the source of EMI involves controlling the voltage applied to the control input of the switching transistor or pass element by providing a ramp function rather than a step function. One approach using this method is shown in FIG. 1. In this approach a parallel R-C circuit 20 is introduced between the input voltage and the control input of the switching transistor 15, thereby providing a gradual increase (or decrease) of the voltage at the control terminal of the switching transistor according to the charging (or discharging) rate of the capacitor.

It is known to solve the problem of EMI in power switching by providing linearly increasing signals to the control terminal of a switching device. However, there are problems encountered in power switching which is too slow, e.g., the human factors problems with the failure of an equipment to respond rapidly to a manual power actuation and the heavy power dissipation in the switching device during slow switching transitions. It is easily seen that well-regulated rise and fall times provide the ideal solution to power switching. A further advantage of well-regulated switching transitions is found in the desirability of predictable power turn-ons and turn-offs for sophisticated electronic systems in which sub-systems must be powered-on and powered-off at essentially the same time or according to a defined sequence. The switching transistor of the circuit of FIG. 1 operates over a very small portion of the charging and discharging range of the capacitor, making the switching transition times almost entirely dependent on the value of capacitance and the gain of the transistor. These parameters tend to vary widely in production quantity making the goal of predictable switching transition times extremely difficult to achieve. The effect of temperature changes on these parameters is also significant.

In accordance with one embodiment of the present invention an apparatus is disclosed for providing linear DC power switching wherein the switching transitions have linearly regulated rise and fall times responsive to an input control signal. The apparatus includes a symmetrical ramp generator which generates rising ramp signals in response to one state of the control signal and falling ramp signals in response to the other state. Switch means are provided which couple a power source at the input terminal to a load at the output terminal according to the signal level at the switch control terminal. The switch means provides an essentially constant potential drop between its input and output terminals when the signal level at the control terminal is above the threshold that provides coupling of power to the load. The apparatus further includes controllable limiter means responsive at one of its inputs to the input control signal and which provides, at its output, a ramp control signal applied to the control terminal of the switch means. The apparatus further includes means coupled between the output terminal of the switch means and a second input of the limiter means for limiting the slope of the ramp control signal so that the rise and fall times of the power applied to the load are linearly regulated.

Figure 1:
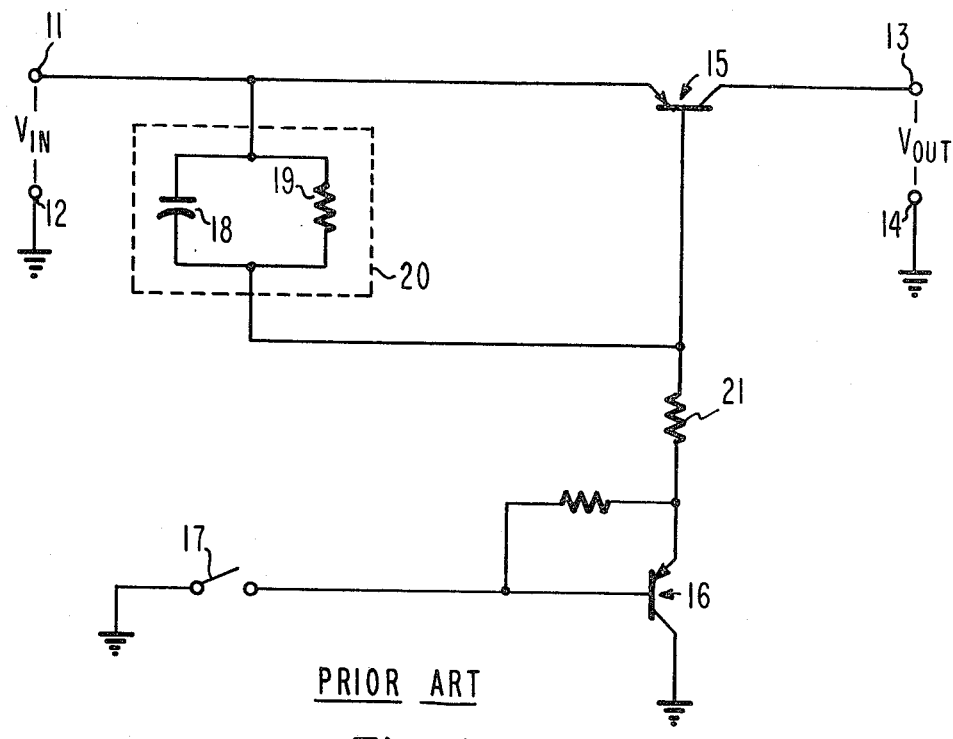
FIG. 1 is a schematic diagram of a switching apparatus for controlling the switching transitions according to the prior art.

Referring to FIG. 1, there is illustrated a schematic diagram of a switching apparatus for controlling the turn-on and turn-off switching transitions for a DC power controller according to the prior art. The apparatus includes a transistor 15 functioning as a switching device, a PNP transistor 16 having a switch 17 in its base circuit, and an R-C network 20. The PNP switching transistor 15 is coupled between input terminal 11 and output terminal 13. The collector of transistor 16 is connected to ground and the emitter electrode is coupled via current-limiting resistor 21 to the base of switching transistor 15. R-C network 20 is coupled between the input terminal 11 and the base of transistor 15.

A positive DC voltage $V_{out}$ appears across terminals 13 and 14 in response to a positive DC voltage $V_{in}$ applied across terminals 11 and 12, respectively, when switching transistor 15 is driven into saturation. No voltage appears across terminals 13 and 14 when transistor 15 is non-conductive. Transistor 15 is controlled by PNP transistor 16 which, in turn, is either non-conductive or fully-conductive, according to the state of switch 17 connected to its base electrode. Switch 17 is representative of a switching device which may be a transistor. When switch 17 is open (representing the collector and emitter electrodes of a non-conducting transistor), the voltage on the base of transistor 16 is equal to its emitter voltage, no base current flows, and transistor 16 is non-conducting. Under this condition the emitter and base voltages of transistor 15 are substantially equal and the device is non-conducting. When switch 17 (representing the collector and emitter electrodes of a saturated transistor) connects the base to ground, transistor 16 conducts fully and the voltage at the base electrode of transistor 15 drops below the emitter voltage. This causes conduction through the emitter and collector electrodes of transistor 15.

Capacitor 18 and resistor 19 comprise an R-C delay circuit 20 which in the turn-on state limits the rate at which the voltage at the base of transistor 15 changes from a voltage approximating $V_{in}$ or cutoff to a voltage sufficiently low, at the base relative to the emitter, to cause transistor 15 to saturate, and which also in the turn-off state limits the rate at which the voltage at the base of transistor 15 increases from the saturation voltage to approximately $V_{in}$. With transistor 16 in a non-conducting state, the voltage across capacitor 18 is zero. When transistor 16 switches to a conducting state, the voltage across capacitor 18 builds at an exponential rate, determined mainly by the component values of capacitor 18 and resistors 19 and 21, and hence the switching transistor 15 goes gradually into a fully conducting state, allowing the voltage across output terminals 13 and 14 to build slowly to a value somewhat less than $V_{in}$. With transistor 16 in a fully-conducting state, the voltage across capacitor 18 is some positive value, determined by the base-emitter drop of transistor 15. When transistor 16 switches to a non-conducting state, the voltage across capacitor 18 decays at an exponential rate and the transistor 15 goes gradually into a non-conducting state, allowing the voltage across output terminals 13 and 14 to decay slowly to zero.

While the circuit of FIG. 1 performs the task of limiting the switching transitions of the voltage at the output of switching transistor 15, so as to diminish the intensity of EMI radiation, it does not provide satisfactory regulation of the rise and fall times for the reasons noted earlier.

Figure 2:
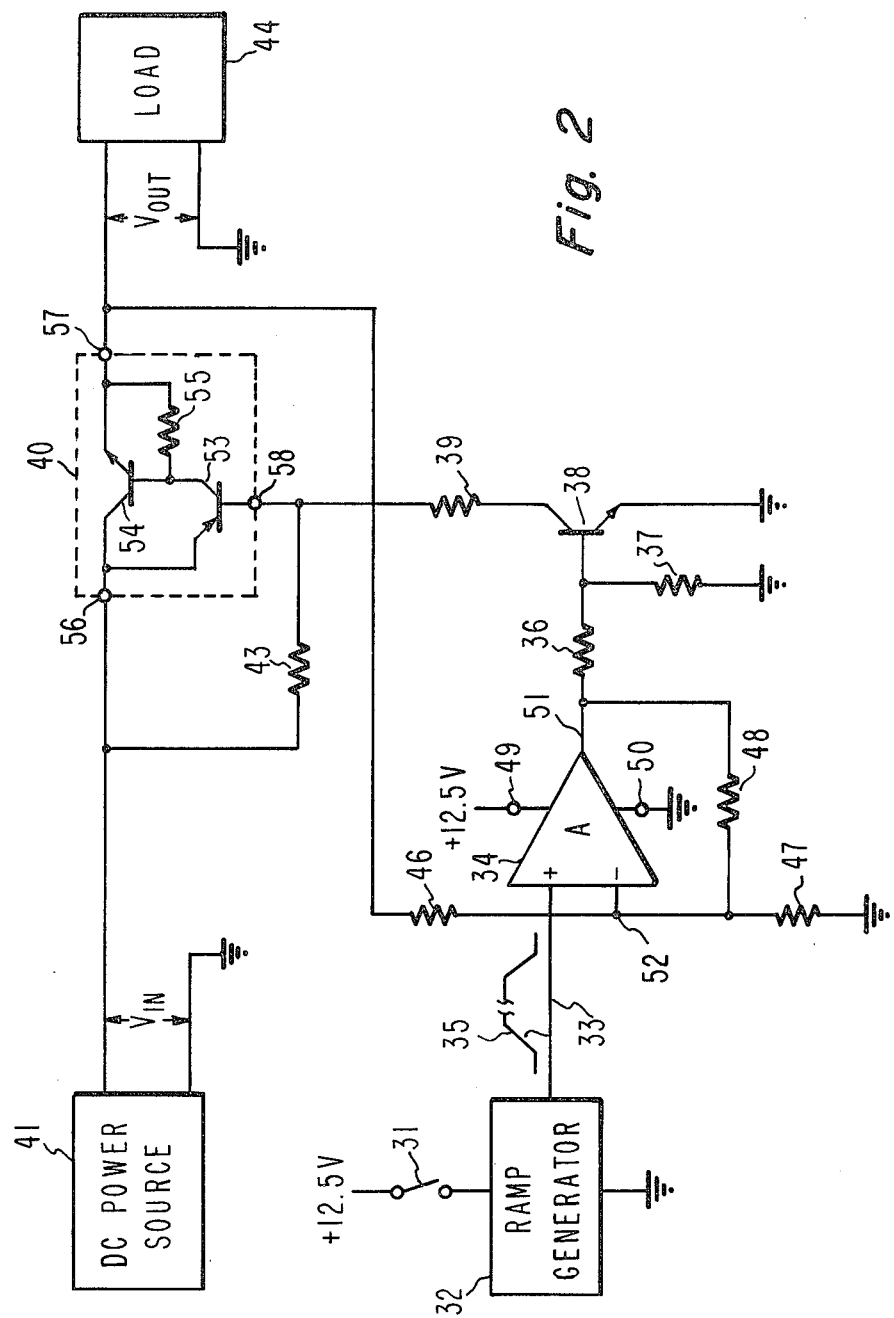
FIG. 2 is a schematic diagram of an apparatus for providing linear switching according to one embodiment of the present invention.

Referring to FIG. 2, a schematic diagram is shown of an apparatus according to one embodiment of applicant's invention for providing DC power control having linear regulated switching transitions. A symmetrical ramp generator 32 supplies a ramp signal 35 to one input of a differential-input amplifier 34 in response to a control signal from switch 31. The output signal from amplifier 34 drives the base of a transistor 38 which provides a ramp control signal to the control terminal 58 of a switching device 40. The input terminal 56 and output terminal 57 of switching device 40 are connected to a DC power source 41 and a load 44, respectively. A portion of the signal at the output terminal 57 of switching device 40 is fed back via resistor 46 to the other differential input of amplifier 34 to limit the rate at which the signal on the amplifier output rises or falls and thereby provide linear regulation of the rise-time and fall-time of the DC power from the source 41 to the load 44.

DC power source 41, connected to the input terminal 56 of switching device 40, provides a signal having a voltage of $V_{in}$ with respect to ground. In the example, $V_{in}$ may assume any value within the range of 17.5 to 30 volts. Switching device 40, shown in FIG. 2 as a pair of transistors 53 and 54 and a resistor 55, includes an input terminal 56, and output terminal 57, and a control terminal 58. The DC power output signal is applied to the load device 44 whch is connected to the output terminal 57 of switching device 40. $V_{out}$, the voltage applied to load 44, assumes a value between 0 volts, when switching device 40 is open, and a voltage slightly less than $V_{in}$, when switching device 40 is fully conducting.

Upon closure of switch 31, which may represent a transistor (not shown) a positive voltage, shown in the example as +12.5 volts reference voltage from a source, is applied across a symmetrical ramp generator 32. Symmetrical ramp generator 32 may be any means for generating a signal which waveform approximates a ramp shape in both rising and falling directions when switch 31 is closed and opened, respectively. One configuration (not shown) might be a capacitor and resistor configured as an integrator between the voltage source and ground resulting in a signal 35 on the ramp generator output lead 33 having exponential growth upon the closing of switch 31 and exponential decay upon the opening of switch 31. For the example shown, the excursion of the ramp signal 35 is between 0 and 11 volts and the slope is such as to require approximately 0.5 to 1.0 millisecond for this excursion.

A controllable limiter including a differential amplifier 34 and a transistor 38 is coupled between the ramp generator 32 and the switching device 40. Differential amplifier 34 has two inputs, one a non-inverting (+) input connected to ramp generator 32 via signal path 33 and the other an inverting (−) input connected to resistors 46, 47, and 48 at summing point 52. Differential amplifier 34 is for the example one-quarter of a type CA124 quad operational amplifiers made by RCA Solid State Division, Somerville, N.J. It is connected between a positive voltage of, for the example, 12.5 volts reference voltage at terminal 49 and ground at terminal 50. Differential amplifier 34 produces an output voltage on path 51 proportional to the differential voltage existing between its non-inverting (+) and inverting (−) inputs. Resistor 48 is connected between the inverting (−) input of differential amplifier 34 and output path 51 and provides a path for degenerative feedback that determines the gain of differential amplifier 34 and the range of ramp signal 35 over which amplifier 34 responds. This gain, in turn, determines the rise and fall times of the signal on output path 51 in response to the differential signal between the non-inverting (+) and inverting (−) inputs of amplifier 34.

The output signal from differential amplifier 34 is applied to the voltage divider comprising resistors 36 and 37. The typical range of output signal voltages is 0 to 10 volts, and the values of dividing resistors 36 and 37 are typically such as to maintain the saturating voltage of about 0.7 volt at the base of transistor 38 when the maximum voltage is applied at the output of amplifier 34. Transistor 38 must have a $V_{CEO}$ rating in excess of $V_{in}$ and, in this embodiment, for example, is a 2N5339 type. When the voltage at its base electrode is at 0 volts, the transistor 38 is non-conducting. But as its base current increases in response to an increase in voltage at the output of differential amplifier 34, current begins to flow from the collector to the emitter of transistor 38. This collector-to-emitter current flow increases in response to an increase in the base current until the transistor 38 achieves saturation. The upper voltage limit at the output of differential amplifier 34 and the resistance values of dividing resistors 36 and 37 are selected so as to maintain transistor 38 in saturation so long as the ramp generator output signal 35 is kept at its highest potential. Resistor 39, connected between the control terminal 58 of switching device 40 and the collector of transistor 38, limits the flow of collector current through transistor 38 to an amount just sufficient to maintain switching device 40 in saturation for its rated current, thereby minimizing the power consumed by the DC power control.

In the present embodiment the switching device 40 employs two transistors 53 and 54 in a quasi-Darlington configuration. Whereas a single PNP transistor might have been employed as the pass element, there are very few PNP transistors available with current ratings sufficient to act as power controller switching elements for high current applications. The quasi-Darlington configuration offers lower quiescent control current for high output current and low saturation voltage than would be provided by a single PNP transistor or a Darlington PNP switching element. NPN transistors with adequate current drive are readily available, but they require a base voltage more positive than their emitter voltage to drive the transistor into conductivity.

The switching device 40 as shown in FIG. 2 uses a PNP transistor 53 as a driver stage of output NPN transistor 54. Transistor 54 has its collector and emitter electrodes connected to the input terminal 56 and output terminal 57, respectively, of switching device 40. Transistor 53 has its emitter and base electrodes connected to the input terminal 56 and control terminal 58, respectively, of switching device 40, and its collector is connected to the base of transistor 54. When transistor 53 is fully on, i.e., transistor 38 is in saturation, the voltage drop between emitter and collector is typically 0.1 volt. Therefore, transistor 53 drives the base of transistor 54 at a voltage 0.1 volt less than $V_{in}$. Assuming a typical 0.7 volt drop between the base and emitter of transistor 54 when fully on, it can be seen that the total voltage drop across the collector to emitter of output transistor 54 is 0.8 volts. Therefore, at room temperature the voltage at the output terminal 57 of switching device 40 will be approximately 0.8 volt below the voltage at the input terminal 56, an acceptable voltage drop in this application. Variations in temperature may cause these approximated voltage drops to differ from the stated values, but at any given temperature the voltage drop across transistor 54 will remain substantially constant over a range of load 44 current requirements. In the example, transistor 53 is suitably a type 2N3792 and transistor 54 is suitably a type 2N6327, both manufactured by RCA Solid State Division.

Resistor 55, connected between the base and emitter of transistor 54, assures that under high temperature conditions, when transistor 53 is not conducting, a potential due to leakage current is not developed between the base and emitter electrodes causing transistor 54 to conduct. Similarly, resistor 43, connected between the base and emitter of transistor 53, prevents that transistor from conducting under high temperature conditions when transistor 38 is not conducting.

Feedback resistor 46, connected between output terminal 57 of switching device 40 and the summing point 52, feeds a fraction of the signal appearing at the output terminal 57 back to the inverting (−) input of amplifier 34. The aforesaid fraction is set by the resistance values of resistors 46 and 47, in their configuration as a voltage divider, and is determined by the common mode range of the inverting (−) input of amplifier 34. This degenerative feedback serves to limit the differential voltage appearing across the non-inverting (+) and inverting (−) inputs of amplifier 34 during the time in which the ramp signal 35 is increasing or decreasing. Thus, at the same time that the ramp signal 35 causes a change in voltage on the output of amplifier 34 which, in turn, causes a potential to be developed across the terminals of load 44, the feedback signal applied to the inverting (−) input of amplifier 34 via feedback resistor 46 tends to limit the effect of the ramp signal 35 in the amplifier 34 output signal by reducing the difference voltage between the two inputs. The effect of this limiting is to produce a slow excursion of the voltage on the base of transistor 38 through its linear range. This is necessary to maintain linearity on the output of a current-controlled transistor 38 when it is being driven by a voltage-controlled device (differential amplifier 34).

The feedback signal developed across resistor 46 is taken directly from the output terminal 57 of the switching device 40, which is the same node as the voltage terminal on load 44. There is no series resistor in the input/output path; when the switching device 40 is fully on, the only voltage drop in the input/output path is the approximately 0.8 volt drop (at room temperature) across output transistor 54, a fixed voltage drop. Hence, at constant temperatures the voltage appearing across output terminals 44 and 45 will remain substantially the same for varying current requirements of the load.

The output voltage across the load 44 does not begin to appear, in response to an increasing ramp signal 35, until the signal applied to the base of transistor 38 reaches approximately 0.65 bolts. Hence there is an inherent delay between the actuation of the ramp signal 35 and the turn-on of the switching device 40. As the ramp signal 35 increases, the signal at the output 51 of amplifier 34 increases at a rate determined by feedback resistor 48. Once the voltage at the base of transistor 38 reaches approximately 0.65 volts, the transistor 38 begins to conduct, driving switching device 40 into conductivity, and providing an increasing output voltage across load 44. At this point the slope of the signal at the output 51 of amplifier 34 is modified by the effect of feedback resistor 46. This modified slope continues until the voltage at the base of transistor 38 reaches approximately 0.7 volts, whereupon transistor 38 is saturated and the switching device 40 is fully conductive. Further increases in the ramp signal 35 have no further effect on the conductivities of transistor 38 or switching device 40.

The turn-on response of the signal appearing at the load 44 can be further delayed with respect to the rising ramp signal 35 provided by ramp generator 32 by adding silicon diodes in a forward current direction in series with the base electrode of transistor 38. Each diode so added would impart an approximately 0.7 volt drop to the amplified signal, thus requiring a higher potential on the input ramp signal 35 to drive transistor 38 into conduction and providing the effect of further delaying the turn-on of switching device 40 in response to ramp signal 35.

In the embodiment shown in FIG. 2, a single switching device 40 is shown. However, in those situations where higher current drive is required, two or more switching devices 40 may be parallel-connected, having all of their respective input, output and control terminals connected. The inclusion of additional switching devices 40 will require greater current drive from transistor 38. Power economy considerations dictate that resistor 39 be chosen to limit the current flow to an amount just sufficient to maintain transistor 38 in saturation, so the resistance value of 39 must be decreased to accomodate additional switching devices 40.

A circuit as described above in connection with FIG. 2 was constructed and tested and the components had the following values:

| | |
|---|---|
| Resistor 36 | 3.3 k ohm, |
| Resistor 37 | 820 ohm, |
| Resistor 39 | 500 ohm, |
| Resistor 43 | 130 ohm, |
| Resistor 46 | 1.2 M ohm, |
| Resistor 47 | 75 k ohm, |
| Resistor 48 | 100 k ohm, |

-continued

| | |
|---|---|
| Resistor 55 | 1.0 k ohm. |

What is claimed is:

1. An apparatus for providing linear switching of DC power from a source to a load in which the switching transitions have linearly regulated rise and fall times responsive to an input control signal, said apparatus comprising:

a symmetrical ramp generator responsive to said control signal in one state for generating a rising ramp signal and in another state of said control signal for generating a falling ramp signal;

switch means including input and output terminals for coupling said source and said load, respectively, and having a switch control terminal, said switch means providing DC power from said source to said load according to the signal level at said switch control terminal, said switch means being of the type to provide essentially constant potential drop between said input and output terminals when said signal level is above that certain threshold that provides coupling of power from said source to said load;

controllable limiter means including first and second limiter control terminals, said first limiter control terminal responsive to said ramp signal for providing a ramp control signal to said switch control terminal for thereby controlling the DC power from said source to said load; and means coupled between the output terminal of said switch means and said second limiter control terminal for limiting the slope of said ramp control signal to always linearly regulate the rise and fall times of said power to said load.

2. The apparatus according to claim 1 wherein said switch means includes a first transistor having an input terminal coupled to said source, an output terminal, and a control terminal coupled to said switch control terminal, said first transistor being of a first conductivity type, and a second transistor having input and output terminals coupled to said source and said load, respectively, and a control terminal coupled to the output terminal of said first transistor, said second transistor being of a second conductivity type, said first and said second conductivity types being mutually complementary, and wherein said first transistor provides, in response to current flow at the control terminal of said switch means, a control signal to said second transistor which determines the current conduction through said switch means.

3. The apparatus according to claim 1 wherein said controllable limiter includes a difference amplifier and control transistor coupled between said ramp generator and said switch control terminal, said difference amplifier coupled to said ramp generator at one input thereof and coupled to said switch output terminal at a second input thereof for limiting the shape of said ramp control signal according to the power to said load.

* * * * *